US011826829B2

(12) United States Patent
Sheinman et al.

(10) Patent No.: US 11,826,829 B2
(45) Date of Patent: Nov. 28, 2023

(54) DYNAMIC DETECTION OF LAYER THICKNESS FOR AN ADDITIVE MANUFACTURING PROCESS

(71) Applicant: Stratasys Ltd., Rehovot (IL)

(72) Inventors: Yehoshua Sheinman, RaAnana (IL); Shai Hirsch, Rehovot (IL); Almog Shahar, Kibbutz Beit-Kama (IL)

(73) Assignee: Stratasys Ltd., Rehovot (IL)

( * ) Notice: Subject to any disclaimer, the term of this patent is extended or adjusted under 35 U.S.C. 154(b) by 275 days.

(21) Appl. No.: 16/763,998

(22) PCT Filed: Nov. 14, 2018

(86) PCT No.: PCT/IL2018/051229
§ 371 (c)(1),
(2) Date: May 14, 2020

(87) PCT Pub. No.: WO2019/097512
PCT Pub. Date: May 23, 2019

(65) Prior Publication Data
US 2020/0391293 A1    Dec. 17, 2020

Related U.S. Application Data

(60) Provisional application No. 62/585,564, filed on Nov. 14, 2017.

(51) Int. Cl.
*B22F 3/02* (2006.01)
*B22F 10/85* (2021.01)
(Continued)

(52) U.S. Cl.
CPC .............. *B22F 3/02* (2013.01); *B22F 3/16* (2013.01); *B22F 10/85* (2021.01); *B22F 12/33* (2021.01);
(Continued)

(58) Field of Classification Search
CPC .. B22F 3/16; B22F 10/10; B22F 10/14; B22F 10/37; B22F 10/38; B22F 10/50;
(Continued)

(56) References Cited

U.S. PATENT DOCUMENTS 7,896,639 B2    3/2011  Kritchman et al.
2002/0104973 A1   8/2002  Kerekes
(Continued)

FOREIGN PATENT DOCUMENTS

WO    WO 2017/179052    10/2017
WO    WO-2017179052 A1 * 10/2017    .............. B22F 10/00
(Continued)

OTHER PUBLICATIONS

Communication Pursuant to Article 94(3) EPC Dated Jul. 6, 2021 From the European Patent Office Re. Application No. 18815358.9. (8 Pages).
(Continued)

*Primary Examiner* — Anthony M Liang
*Assistant Examiner* — Danny N Kang (57) ABSTRACT

A method for dynamically controlling layer thickness during an additive manufacturing process of building a block including an object with layers of powder material, detecting a height of the block after each layer is compacted, determining a delta between the detected height and a height in a computer model defining slices of the block and compensating for the determined delta in subsequent cycles. A cycle in the additive manufacturing process includes selectively printing a layer pattern, spreading a powder layer over the layer pattern with a spreader and compacting the powder layer with the layer pattern.

17 Claims, 6 Drawing Sheets

(51) Int. Cl.
| | |
|---|---|
| *B33Y 10/00* | (2015.01) |
| *B33Y 50/02* | (2015.01) |
| *B22F 10/50* | (2021.01) |
| *B22F 10/38* | (2021.01) |
| *B22F 12/60* | (2021.01) |
| *B22F 3/16* | (2006.01) |
| *B22F 12/33* | (2021.01) |
| *B22F 12/90* | (2021.01) |
| *B22F 10/14* | (2021.01) |
| *B22F 10/37* | (2021.01) |
| *B22F 12/63* | (2021.01) |
| *B22F 10/64* | (2021.01) |

(52) U.S. Cl.
CPC .............. *B22F 12/60* (2021.01); *B22F 12/90* (2021.01); *B22F 10/14* (2021.01); *B22F 10/37* (2021.01); *B22F 10/38* (2021.01); *B22F 10/50* (2021.01); *B22F 10/64* (2021.01); *B22F 12/63* (2021.01); *B22F 2203/00* (2013.01); *B33Y 10/00* (2014.12); *B33Y 50/02* (2014.12)

(58) Field of Classification Search
CPC ...... B22F 10/85; B22F 2203/00; B22F 10/20; B22F 12/00; B22F 2005/103; B22F 3/18; B22F 3/02; B22F 10/00; B33Y 10/00; B33Y 50/02; B33Y 30/00; Y02P 10/25; B29C 64/165; B29C 64/205; B29C 64/393
See application file for complete search history.

(56) References Cited

U.S. PATENT DOCUMENTS

| | | | |
|---|---|---|---|
| 2013/0077996 | A1* | 3/2013 | Hanson .................. G03G 15/24 399/130 |
| 2017/0165750 | A1 | 6/2017 | Umeda et al. |
| 2017/0173696 | A1 | 6/2017 | Sheinman et al. |

FOREIGN PATENT DOCUMENTS

| | | |
|---|---|---|
| WO | WO 2018/173050 | 9/2018 |
| WO | WO 2019/097512 | 5/2019 |

OTHER PUBLICATIONS

International Preliminary Report on Patentability dated May 28, 2020 From the International Bureau of WIPO Re. Application No. PCT/IL2018/051229. (11 Pages).
International Search Report and the Written Opinion dated Feb. 12, 2019 From the International Searching Authority Re. Application No. PCT/IL2018/051229. (16 Pages).

* cited by examiner

DYNAMIC DETECTION OF LAYER THICKNESS FOR AN ADDITIVE MANUFACTURING PROCESS

RELATED APPLICATIONS

This application is a National Phase of PCT Patent Application No. PCT/IL2018/051229 having International filing date of Nov. 14, 2018, which claims the benefit of priority under 35 USC § 119(e) of U.S. Provisional Patent Application No. 62/585,564 filed on Nov. 14, 2017. The contents of the above applications are all incorporated by reference as if fully set forth herein in their entirety.

FIELD AND BACKGROUND OF THE INVENTION

The present invention, in some embodiments thereof, relates to three-dimensional (3D) printing with layers of powdered material and, more particularly, but not exclusively, to 3D printing of metal objects with powdered metal as the building material.

A number of different processes for fabricating solid objects by 3D printing with successive layers of powdered material are known. Some known 3D printing techniques selectively apply a liquid binder material based on a 3D model of the object, binding the material together layer by layer to create a solid structure. In some processes, the object is heated to further strengthen bonding of the material at the end of the building process. During the building process, the successive layers of powdered material is dispensed and spread across a building platform. Thickness of layers is typically a function of many parameters, among them the volume of the powder dispensed per layer and height at which a spreader is applied to spread the layer.

U.S. Patent Application Publication No. US 2017/0173696 entitled "METHOD AND APPARATUS FOR 3D PRINTING BY SELECTIVE SINTERING," the contents of which are incorporated herein by reference, discloses a method for forming an object by 3D printing that includes the steps of providing a layer of powder on a building tray, printing a mask pattern on the layer, die compacting the layer, and sintering the unmasked portion per layer. A powder dispenser adds a new layer on a building tray and a roller spreads the powder. Thickness of a layer after compaction is monitored. A height of a building tray with respect to the roller may be adjusted to alter a thickness of a current layer to compensate for drift caused by deviations in layer thicknesses of one or more previous layers. In addition, a defined volume dispensed may be adjusted responsive to a thickness of the compacted layer(s). A controller of the apparatus uses one or more lookup tables stored in memory to control adjustments in layer thicknesses.

SUMMARY OF THE INVENTION

According to an aspect of some embodiments of the present disclosure there is provided a system and method for dynamically detecting Z heights of layers during an additive manufacturing process. In some example embodiments, the Z heights are detected after compaction of a layer. Optionally, a detected Z height is compared to a modeled Z height for that layer as defined by a computer model of the object. According to some example embodiments, the drift in Z heights is detected and compensation may be initiated to reduce drift in subsequent cycles. In some example embodiments, compensation is based on controlling a height of a roller spreading the powder layer. In some example embodiments, changes in roller height are introduced over a defined number of cycles to compensate for detected drift s in the Z heights.

According to an aspect of some example embodiments, there is provided a method for dynamically controlling layer thickness during an additive manufacturing process, the method comprising: building a block including an object with layers of powder material in an additive manufacturing process, wherein a cycle in the process includes: selectively printing a layer pattern; spreading a powder layer over the layer pattern with a spreader; and compacting the powder layer with the layer pattern; detecting a height of the block after each layer is compacted; determining a delta between the detected height and a height in a computer model defining slices of the block; and compensating for the determined delta in subsequent cycles.

Optionally, the height of the block is detected while the block is pressed against a pressing plate at a defined pressure.

Optionally, the height of the block is detected with one or more optical sensors.

Optionally, the height of the block is detected with a plurality of optical sensors spatially distributed with respect to the layer.

Optionally, the method includes determining height of the block based on average outputs from the plurality of optical sensors.

Optionally, the method includes determining flatness of an upper surface of the block based on comparing output from the plurality of optical sensors.

Optionally, the height of the block is detected while selectively printing the layer pattern.

Optionally, the one or more optical sensors are mounted on a printing heads block ahead of the printing heads with respect to direction of movement of the printing heads block.

Optionally, compacting the powder layer comprises raising a building surface on which the block is supported toward a pressing plate and pressing the powder layer against the pressing plate with a defined compaction pressure.

Optionally, the method includes lowering the building surface to an extent that the block disengages from the pressing plate; raising the building surface toward the pressing plate after the lowering; pressing the block against the pressing plate with a defined pressure; and detecting height of the building surface while the defined pressure is applied.

Optionally, lowering the building surface is configured to release residual stresses on the pressing plate and on the block during the compaction.

Optionally, the defined pressure for measuring a height of the built layers is between 0.1 to 1 MPa.

Optionally, a pressure applied for compaction is between 250 MPa and 300 MPa.

Optionally, the block is supported on a Z carriage and the height of the built layers is detected based on a detected height of the Z carriage while a Z-axis drive piston presses the powder layer against a pressing plate with the predefined pressure.

Optionally, the method includes monitoring a thickness of the layers, wherein the thickness of a single layer is defined as a difference between the detected height of the block over two consecutive cycles.

Optionally, the method includes altering the height of the spreader with respect to the block by a defined amount and over a defined number of subsequent cycles based on the delta.

Optionally, the height of the spreader is altered within a range between 60 μm to 300 μm.

Optionally, altering the height of the spreader is defined based on a trend in the delta over a plurality of cycles.

Optionally, altering the height of the spreader is based on a machine learning process.

Optionally, the machine learning process is configured to converge the delta toward zero over the building process.

Optionally, the layer pattern is printed with thermal ink.

Optionally, the powder spreading is performed after selectively printing the layer pattern.

Optionally, the powder material is metal powder.

Optionally, the block is a green compact.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the Drawings.

DESCRIPTION OF SPECIFIC EMBODIMENTS OF THE INVENTION

The present invention, in some embodiments thereof, relates to three-dimensional (3D) printing with layers of powdered material and, more particularly, but not exclusively, to 3D printing of metal objects with powdered metal as the building material.

As used herein, the material that is deposited to form the layer pattern may be referred to as printed material or ink. As used herein, the term "solidifiable ink" refers to printed material that is a liquid or can be liquefied to allow deposition and can be solidified when deposited on a building surface. Non-limitative examples of solidifiable inks include, photocurable polymers (also referred to as "photopolymer material"), thermal inks (also referred to as "phase-change inks") an example of which is wax, and any combination thereof. Thermal ink and phase change ink as used herein are interchangeable terms and may be defined as a material that is solid at room temperature (e.g. about 25° C.), has a melting point of less than 120° C., viscosity of less than 50 cPs between the melting point temperature and 120° C., and that evaporates with substantially no carbon traces at a temperature of above 200° C. Substantially, 'no carbon traces' is defined as less than wt. 5% or less than wt. 1%. In some example embodiments, the thermal ink has a melt temperature of between 55-65° C., e.g., 55-60° C., and a working temperature of about 60-75° C.; the viscosity may be between 15-17 cPs at this working temperature. According to embodiments of the present invention, the thermal ink is configured to evaporate in response to heating with little or no carbon traces.

The powder layers may be powdered metal, other powdered materials such as powdered plastic and powdered ceramic and may be a combination of different types of powdered material. As used herein, the term "printing station" or "3D printing station" or "pattern printing station" includes any apparatus suitable to deposit one or more solidifiable inks on a building surface or on a layer of powder material. The printing station may include a printhead, an extruder, and/or any other suitable means known in the art. Typically, a 3D inkjet printer is used for selective deposition of a solidifiable ink onto a building surface to form a layer pattern on the building surface, over which the powder may be spread. In some exemplary embodiments, the 3D inkjet printing system or printer includes inkjet printing heads assembled on an inkjet printing heads block that moves over the building surface to print a layer or pattern by selective deposition of ink, while the building tray remains stationary. Alternatively, the building tray may be advanced in the scanning direction while the inkjet printing heads block remains stationary in that direction and movable in the orthogonal direction, or completely stationary. In some embodiments, the entire pattern of a specific layer may be printed in a single pass. The process and method of printing an ink layer pattern according to embodiments of the present invention is described in PCT publication WO2018/173050 of the same Applicants, which is incorporated herein in its entirety.

During the process, each layer is built by selectively printing a pattern, spreading a volume of powder over the pattern to form a layer and compacting the layer. The compacting may be by die compaction. Die compacting provides for maintaining a desired footprint of the block of layers during compaction. The order in which spreading, printing and compacting occurs may vary for different systems. At the termination of the layer building process, a green compact including one or more objects (the green objects) is formed. The green compact or green objects within the compact may subsequently be heated or sintered to fuse the powder material into a finished product. Optionally additional compaction may be applied to increase the density of the object prior to sintering.

In one example, the layer pattern is printed in an area forming the object being built. In other examples, the layer pattern is a mask pattern that is printed in an area excluded by the object. In yet other examples, the layer pattern defines a boundary between the area included as part of the object and the area excluded as part of the object.

It is typically desired to build the green compact with layers that have a defined and uniform thickness. Variations in layer thicknesses may affect one or more of strength, surface smoothness and shape stability of the final green compact. In some example embodiments, an accuracy in a desired thickness of +/−15 microns may be reached.

In some example embodiments, regulating layer thickness on an average per layer basis is not sufficient, as accumulated deviations in a desired layer thickness, even while falling within a tolerance range per layer, may lead to significant errors in a final Z height of an object (vertical height) and may also lead to shape distortions due to errors in Z heights of particular layers.

Variations in layer thicknesses may be due to a plurality of parameters. One source of variation in layer thickness may be mechanical tolerances of the 3D printing system. Another source of variation in layer thickness may be due to the printed pattern within a layer of the green compact being built. The material (ink) used for printing the pattern is typically incompressible or significantly less compressible than the powder layer. During compaction, presence of the ink may reduce the overall compressibility of the layer. For example, a layer including less ink or no ink may compress to a greater extent than a layer including more ink during the compaction process. Further variation may be based on repeated compaction pressure applied on lower layers as the upper layers are being built. Due to the numerous parameters that may affect layer thickness, layer thickness and Z heights of the layer that will be attained may be difficult to predict and control during the building process.

According to example embodiments, there is provided a method for dynamically monitoring drift in Z heights of the layers as the layers are being built and for dynamically compensating for the detected deviations. This dynamic compensating may be performed in addition to control scheme to maintain thickness of each of the individual layers within a defined tolerance range. A deviation in Z height may be defined as a delta between a measured Z height and a Z height defined by a corresponding slice in a computer model of the green compact being built. According to some example embodiments, a Z height of a layer is measured at a compaction station of the system.

According to example embodiments, after a Z carriage is lifted against a pressing plate with a compaction pressure to compact the layer, the Z carriage is lowered, disengaging the building surface from the pressing plate to release the pressure and then raised again toward the pressing plate at which time Z height is measured. Optionally, the Z carriage is raised after a defined delay. A relatively large pressure applied during the compaction may lead to temporary deformation of the mechanical parts of the system and of the green compact being built and the defined delay allows the mechanical parts and green compact to regain their shape at steady state.

In some example embodiments, a Z height is determined based on height of a Z carriage while a Z-axis drive motor presses the layer against a pressing plate with the pre-defined pressure. The height of the Z carriage maybe detected with a Z axis encoder. The pre-defined pressure may be a nominal pressure at which the layer is in substantially full contact with a pressing plate.

In other example embodiments, a Z height is determined based on height of a Z carriage while it is moving below an optical distance measuring sensor. The height of the Z carriage may be detected with a Z axis encoder, and the layer thickness is represented by an average of the sensor readouts minus the Z carriage position. Optionally, a plurality of optical sensors is spatially distributed with respect to the layer. In some example embodiments, an average value obtained from the plurality of optical sensors is used as a representative value of layer thickness. In some example embodiments, values obtained from the plurality of optical sensors that are spatially distributed around or without respect to the layer are also used to determine flatness of the layer based on comparing values from the plurality of optical sensors. The optical sensors may be located on a station of the mask printer or on the mask printer itself so that measurements with the optical sensor do not lengthen cycle time. For example, the Z carriage may be lifted to a height '0' based on the encoder and a corresponding output from the optical sensor may be detected. After building a layer, reduce a height of Z carriage by an expected layer thickness, e.g. 115 µm. Detect output from the optical distance sensor and compare with output previously detected that corresponded to the height '0.' The difference in the outputs represents the deviation from the modeled layer thickness, e.g. a deviation from 115 µm.

In some example embodiments, compensation is based on controlling a height between a roller spreading the powder layer and a surface on which the powder layer is spread. Layer thickness may be manipulated based on roller height. In some example embodiments, changes in roller height are introduced over a defined number of cycles based on a detected trend of a delta between a measured Z height and a desired Z height. Changes in roller height may be based on Z movement of the roller or Z movement of the building tray on which the layers are built. Optionally, additional parameters such as the volume of the printed ink, the volume of dispensed powder material, and compaction pressure may also be altered when it is determined that a desired correction cannot be made solely based on roller height adjustment.

In some example embodiments, changes to the roller height are limited to a defined range to maintain the layer thickness within the defined tolerances even during compensation. Increasing the roller height above the defined range is undesirable because it may result in the powder material obstructing a desired continuity of the printed pattern between layers due to the extra height of the powder material. Decreasing the roller height below the range is also not desirable because it may lead to collapse of the printed pattern due a reduced height of the powder layer as compared to the printed pattern, due to lack of support of the printed pattern by surrounding powder material. Instead, adjustments are made based on defining changes in roller height as well defining a number of layers over which the change is maintained. Changes in roller height may be brought about by Z movement of the roller or Z movement of a building tray.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Figure 1:
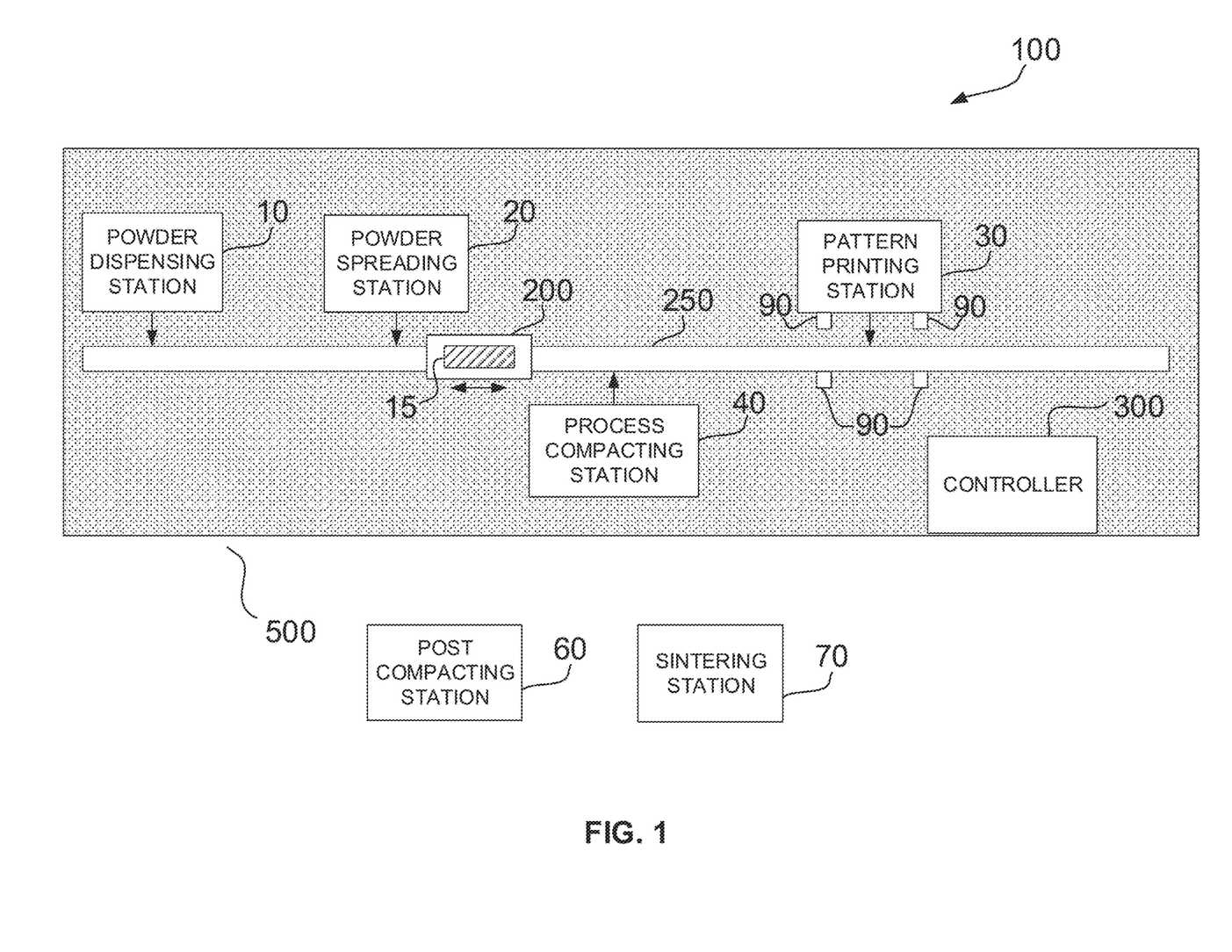
FIG. 1 is a simplified block diagram of an exemplary 3D printing system in accordance with some embodiments of the present invention.

Referring now to the drawings, FIG. 1 shows a simplified block diagram of an exemplary 3D printing system in accordance with some embodiments of the present invention. According to some embodiments of the present invention, a 3D printing system 100 is integrated on a working platform 500. According to some embodiments of the present invention, working platform 500 includes a precision stage 250 on which a building tray 200 is advanced through a plurality of stations for printing a green compact 15 one layer at a time. Typically, precision stage 250 is a linear stage, e.g. an X-Z stage providing motion along a single axis, e.g. an X axis while building a layer and also providing motion in the vertical direction (Z-axis) for adjusting height of tray 200, e.g. lowering tray 200 as each new layer is added.

According to some embodiments of the present invention, working platform 500 includes a printing platform station (also referred to as a pattern printing station) 30, for printing a pattern that defines the object to be built, a powder dispensing station 10 for dispensing powder on tray 200, a powder spreading station 20 for spreading the dispensed powder to form a layer of powder on tray 200, and a compacting station (also referred to as a process compacting station or a compaction station) 40 for compacting the layer of powder. Typically for each layer, printing tray 200 advances to each of the stations and then repeats the process until all the layers have been built.

In some exemplary embodiments, tray 200 begins at printing platform station 30 and then advances to powder dispensing station 10, powder spreading station 20 and lastly to compacting station 40. Typically, compaction is a final stage for building (preparing) a layer. According to some embodiments of the present invention, after compaction of a layer, the Z height of the block of layers on tray 200 is detected at compacting station 40. In some example embodiments, the Z height of the block of layers on tray 200 and/or layer thickness may be measured with one or more optical sensors 90, e.g. optical distance measuring sensor/s at printing platform station 30. Optical sensors 90 may be line of sight sensors. In some example embodiments, optical sensors 90 are laser based refraction/diffraction sensors. Optionally, a plurality of optical sensors 90 are spatially distributed with respect to the layer. In some example embodiments, optical sensors 90 are mounted on the inkjet printing heads block ahead of the printing heads so that the distance or height measurement is performed in the same motion as ink line printing. In some example embodiments, average values obtained from the plurality of optical sensors 90 is used as a representative value of layer thickness. In some example embodiments, values obtained from the plurality of optical sensors 90 is also used to determine flatness of the layer based on comparing values from each of the plurality of optical sensors 90.

A controller 300 controls operation of 3D printing system 100 and coordinates operation of each of the stations with positioning and/or movement of tray 200 on precision stage 250. According to some embodiments of the present invention, controller 300 monitors a Z height after each compaction and selectively introduces changes to roller heights of subsequent layers based on detected drifts in Z heights. Typically, controller 300 includes and/or is associated with memory and processing ability. According to some embodiments of the present invention, controller 300 monitors and compensates for deviations in a desired thickness and Z height of the layers as the green compact is being built.

Optionally, at the end of the layer building process, green compact 15 may be advanced or positioned in a post compacting station 60 for final compaction. According to some exemplary embodiments, green compact 15 is sintered in a sintering station 70.

Figure 2:
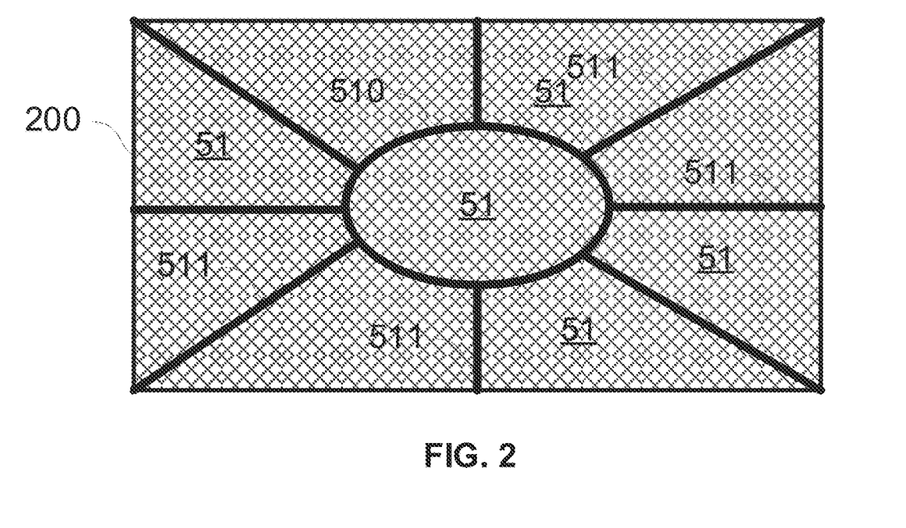
FIG. 2 is a simplified schematic representation of one layer including a printed pattern in accordance with some embodiments of the present invention.

Reference is now made to FIG. 2 showing a simplified schematic representation of one layer including a printed pattern in accordance with some embodiments of the present invention. According to some embodiments of the present invention, printing station 30 prints a contour or boundary 510 of an object being formed at each layer. Contour 510 separates powder material 51 that will form the object from powder material 51 surrounding the object and providing support for the geometry of the object. In some example embodiments, contour 510 is printed with a solidifiable material, such as photopolymer material or phase-change ink. Optionally, in addition to contour 510, printing station 30 also prints pattern 511 that optionally extends from contour 510 toward edges of building tray 200. In some exemplary embodiments, pattern 511 divides powder material 51 surrounding the object into sections, so that that supporting material can be easily separated from the object after the building layers process.

Figure 3:
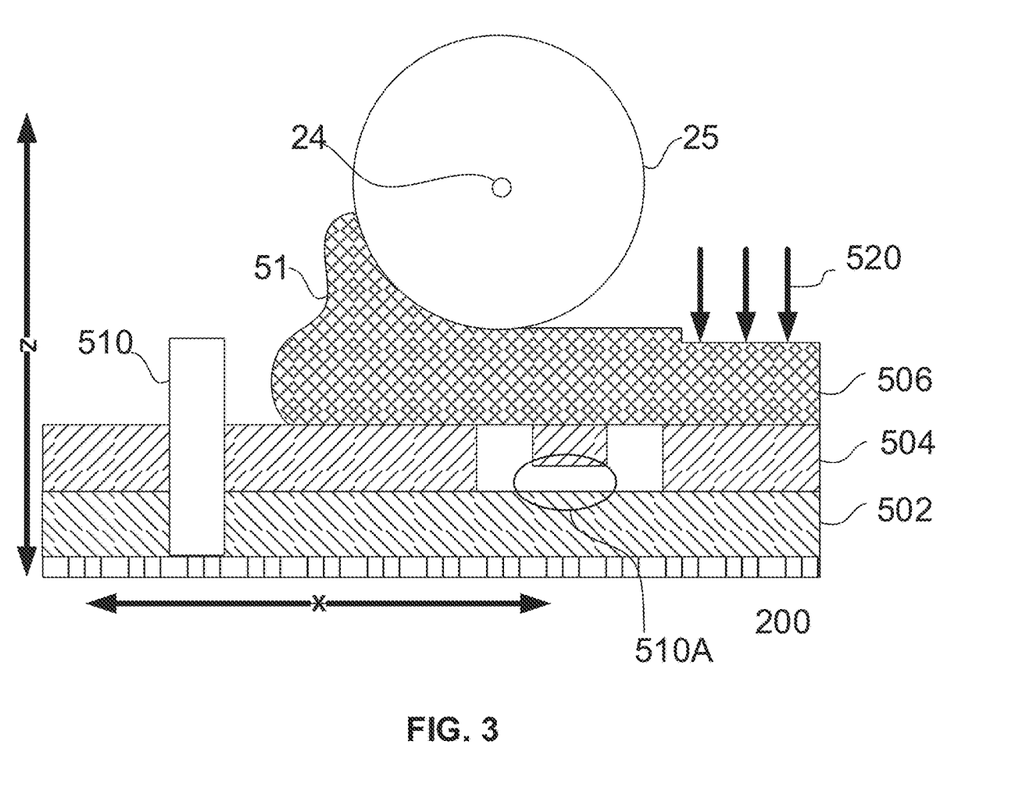
FIG. 3 is a simplified schematic drawing of an example per layer building process in accordance with some embodiments of the present invention.

Reference is now made to FIG. 3 showing a simplified schematic drawing of an example per layer building process in accordance with some embodiments of the present invention. FIG. 3 shows an example third layer 506 in the process of being built over an example first layer 502 and second layer 504. In some exemplary embodiments, a printed pattern 510 is dispensed per layer with a three-dimensional printer. According to some exemplary embodiments, printed pattern 510 is formed from a solidifiable material such as phase-change ink. Printed pattern 510 may physically contact a mask pattern 510 in a previous layer or layers, e.g. layer 504, or may be patterned over an area of a previous layer of powder 51 (building material). A height of printed pattern 510 per layer may be substantially the same as a height of the layer or may optionally be shorter than a height of the layer, e.g. portion 510A of printed pattern 510 in layer 504.

According to some examples, powder 51 is spread over the printed pattern 510 and across a footprint of building tray 200. In some example embodiments, powder 51 is spread with a roller 25. Optionally, roller 25 is actuated to rotate about its axle 24. Optionally, roller 25 is actuated to both rotate about its axle 24 and to move across building tray 200 along an X axis. Once powder 51 is spread across the footprint of tray 200, compaction pressure 520 may be applied over the entire footprint to compact layer 506. Typically, a height of layer 506 is reduced due to process compaction.

According to embodiments of the present invention, this cyclic process yields a green compact or green block. The green compact may include one or more objects (i.e. green bodies) outlined by ink pattern 510 and additional powder material and ink patterns forming support regions outside of the object or within a volume created by the object. According to embodiments of the present invention, the printed pattern 510 defines a boundary around the object(s) and optionally regions within the block that enables extracting the object(s) from the surrounding material. According to some example embodiments, the object(s) once extracted from the surrounding material may be further post processed, e.g. may be further compacted over one or more steps prior to sintering.

Figure 4:
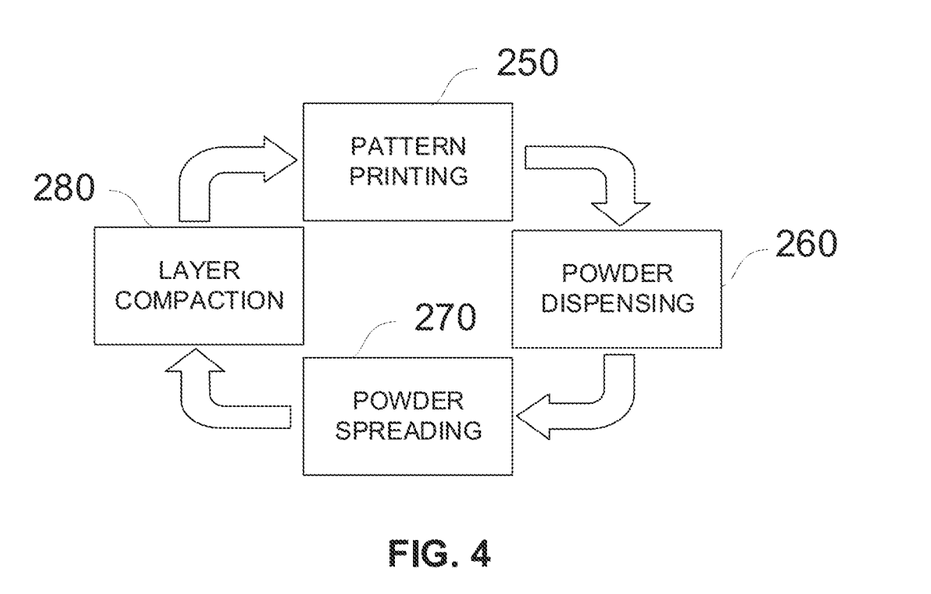
FIG. 4 is a simplified block diagram of an exemplary building process in accordance with some embodiments of the present invention.

Reference is now made to FIG. 4 showing a simplified block diagram of an exemplary building process in accordance with some embodiments of the present invention. According to some exemplary embodiments, an object (i.e. a green body) within a green compact may be constructed layer by layer in a cyclic process. Each cycle of the cyclic process may include the steps of printing a pattern (block 250) at a printing station 30, dispensing a powder material (block 260) at a dispensing station 10, spreading the powder material (block 270) at powder spreading station 20. Optionally, the powder is spread over the printed pattern for that layer. After spreading the powder, the layer may be compacted (block 280) at a compacting station 40. In some exemplary embodiments, the printed pattern is formed from a solidifiable material such as phase-change ink.

According to embodiments of the present invention, each cycle builds one layer of the green compact and the cycle is repeated until all the layers have been built. One or more layers of the green compact may not require a printed pattern. Other layers may include a printed pattern that is other than the pattern associated with the objects being built, which pattern may provide a desired functionality such as balancing the amount of the ink in the volume and/or strengthening the edges of the compact, where the solidified ink serves as a solidified edge of the compact.

Figure 5:
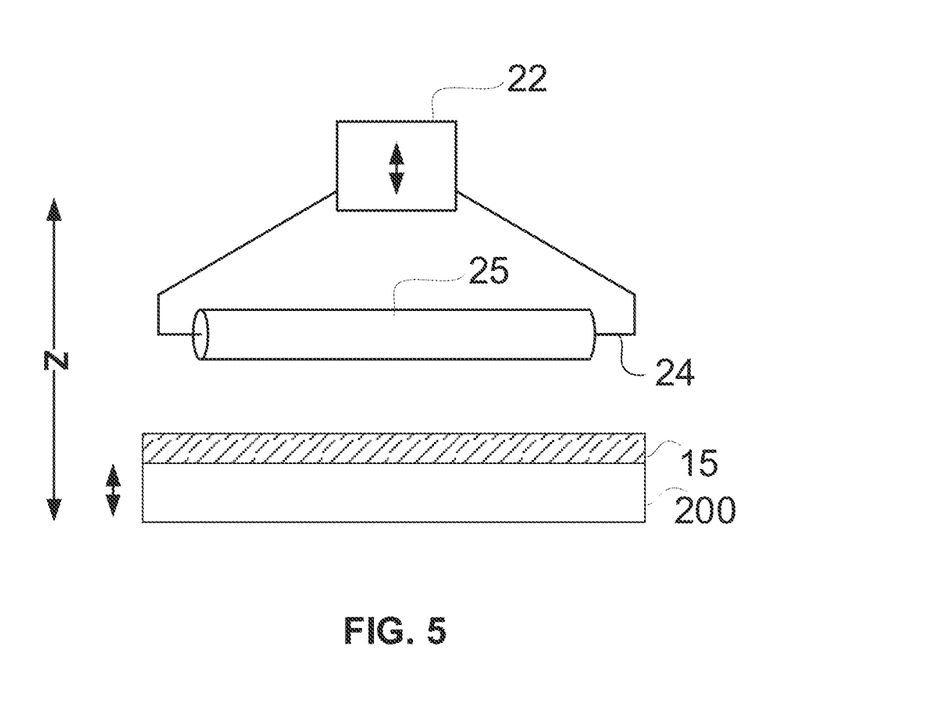
FIG. 5 is a simplified block diagram of a powder spreading station in accordance with some embodiments of the present invention.

Reference is now made to FIG. 5 showing a simplified block diagram of a powder spreading station in accordance with some embodiments of the present invention. Typically, spreading station 20 includes a motorized roller 25 rotatably mounted on an axle 24 and providing forward rotation during spreading. In some exemplary embodiments, a linear motor 22 engages axle 24 and moves roller 25 across the layer for spreading an even layer of powder. Alternatively, roller 25 may be operated while tray 200 is in motion and the motion of tray 200 together with motorized rotation of roller 25 provides the spreading. In some exemplary embodiments, a height of table 200 is adjusted, e.g. moved up/down with a Z stage in order to obtain a defined roller height and thereby a defined layer thickness. Alternatively, roller 25 is held at a height above tray 200 and is lowered with a Z elevator as required for spreading. Typically, roller 25 extends substantially over an entire width of tray 200 and only one pass of the roller is required to spread the powder.

In some exemplary embodiments, a powder layer of about 150 μm thick, e.g. 60 μm to 300 μm thick is spread with roller 25. Typically, the powder layer is spread over a printed pattern and has a height above the mask layer prior to compaction. Typically, after compaction, the height of the powder layer is reduced to the height of the printed layer.

In some exemplary embodiments, a thickness of a layer after compaction is monitored and a height of tray 200 or Z elevator of roller 25 is adjusted to alter a thickness of a subsequent layer to compensate for drifts in Z height as detected while building one or more previous layers.

Roller 25 may be used for slight powder compaction. In one example, up to 25% increase of the natural powder density may be achieved with roller 25 when the powder particles are sufficiently small, e.g. up to 60 μm in diameter with the average distribution of 10-30 μm and have spherical shape. Also, a flat undisturbed surface that the spreading is performed on, can contribute to such powder behavior. In these conditions, spreading and compacting with a roller may be sufficiently repeatable and the Z height of the roller may remain constant.

In exemplary embodiments, a surface for spreading is not typically flat due to the printed patterns, e.g. digital lines of solidified ink that interrupt the spreading process. Furthermore, the powder may optionally include larger powder particles. Optionally, the powder particles may be non-spherical. Roller height control may be applied to overcome variation in layer thickness that may occur when compacting large powder particles, e.g. larger than 60 μm in diameter with the average distribution of 10-30 μm, non-spherical powder particles, as well compacting on a non-flat spreading surface.

Figure 6A:
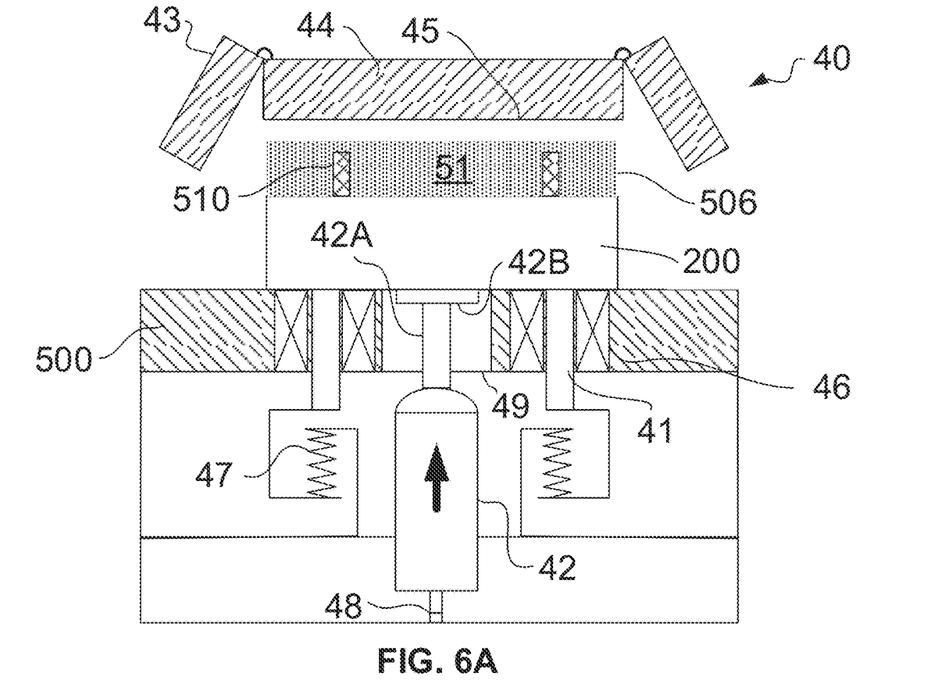
FIGS. 6A and 6B are simplified schematic drawings of an exemplary die compaction station shown in a released and compressed state respectively in accordance with some embodiments of the present invention.
Figure 6B:
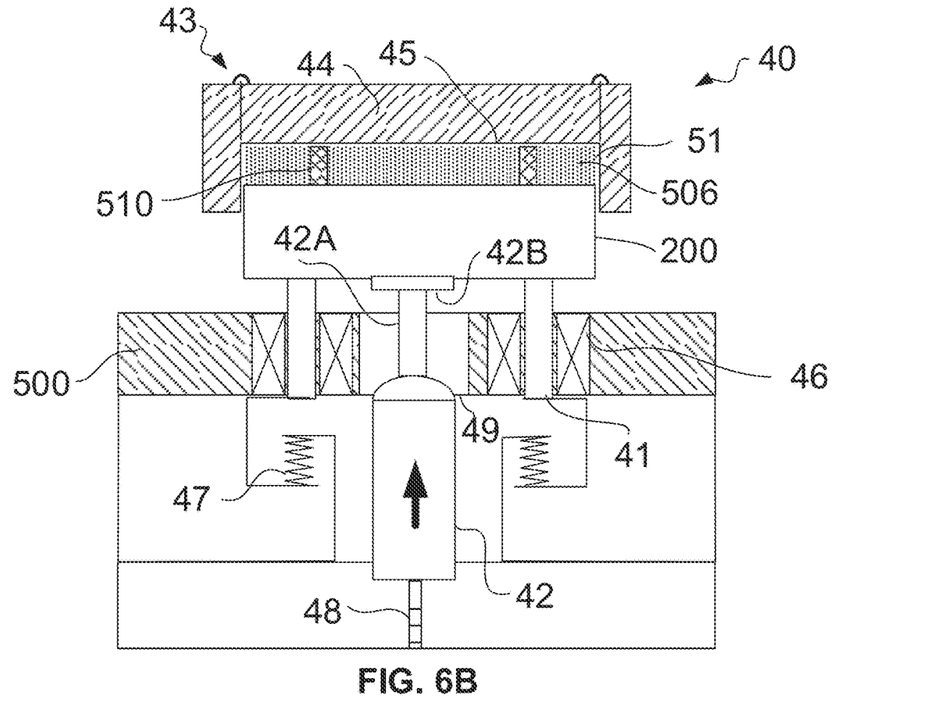

Reference is now made to FIGS. 6A and 6B showing simplified schematic drawings of an exemplary die compaction station shown in a released and compressed state respectively in accordance with some embodiments of the present invention. According to some embodiments of the present invention, a layer, e.g. layer 506 is compacted after spreading powder 51 over printed pattern 510. The compaction process is performed per layer and generates a die per layer. According to some embodiments of the present invention, compaction station 40 includes a piston 42 that is operative to provide the compaction pressure for compacting layer 506. According to some embodiments of the present invention, during compaction, piston 42 is raised through a bore 49 and optionally pushes rod 42A in working platform 500 or precision stage 250 and lifts building tray 200 towards surface 45 positioned above tray 200. Optionally, the addition of rod 42A reduces the distance that piston 42 is required to move to achieve the compaction.

Optionally, once layer 506 makes contact with surface 45 of pressing plate 44, walls 43 close in around the layer 506 to maintain a constant footprint of the layer 506 during compaction. Walls 43 prevent powder flow to the side while air is expelled under compaction pressure. In some exemplary embodiments, tray 200 is secured to one or more linear guides 41 that ride along linear bearings 46 as piston 42 elevates and/or lowers tray 200. In some embodiments, if the distance that the tray 200 needs to travel is relatively small, e.g. 2-5 mm, the linear guides may not be required and the closed side walls 43 can act as guides. Optionally, tray 200 is lifted against one or more compression springs 47.

According to some embodiments of the present invention, a pressure of up to 250 MPa or 300 MPa is applied to compact layer 506. Typically, the applied pressure provides for removing air and bringing powder in layer 506 past its elastic state so that permanent deformation of the layer is achieved. Optionally, the compaction provides for increasing the relative density of the layer to about 70% to 75% or up to 90% depending on the powder material. Optionally, compaction reduces the thickness of a layer by up to 25%. Optionally, a compaction pressure of around 30-90 MPa is applied. Optionally, the compaction is performed at room temperature. In some example embodiments, compaction compresses powder 51 to a height of pattern 510 as long as pattern 510 is defined to have a height of the layer. In some example embodiments, the compaction achieved depends on the quantity and spread of the ink pattern on the layer and may vary from layer to layer.

Typically, the pressure applied is defined based on the powder material and the desired thickness of layer 506. In some example embodiments, a same pressure is applied on each of the layers.

According to some embodiments of the present invention, the Z height of the green compact, e.g. height of one or more layers of the green compact as it is being built, is detected, determined and/or sensed at the compaction station. Optionally, a height of tray 200 while tray 200 with layer 506 presses against surface 45 is detected. In some example embodiments, the height is detected after compaction. In some example embodiments, when the compaction ends, tray 200 is first lowered to detach layer 506 from surface 45 and release residual stresses. After a defined delay, tray 200 is raised again into contact for the measurement. Optionally, Z height is detected while a nominal pressure of 0.1 to 1 MPa is applied on layer 506. The nominal pressure is applied to assure substantial contact between the green compact and pressing plate 44.

During compaction the forces on the green compact and the pressing plate are very high and these create elastic deformations in both. Therefore in accordance with embodiments of the present invention, layer thickness is not detected during compaction.

According to some embodiments of the present invention, height is detected based on an encoder 48 that detects a height of a Z carriage 42B while layer 506 is pressed against surface 45 with a nominal force. According to some example embodiments, thickness of layer 506 is defined as a height of Z carriage 42B after layer 506 minus height of Z carriage 42B after a preceding layer (layer 504) was compacted and pressed against surface 45 with a nominal force.

According to some embodiments of the present invention, controller 300 (FIG. 1) monitors the height and/or the change in height as detected in process compaction station and provides input to powder spreading station or Z stage of tray 200 when adjustments in a height of roller 25 with respect to tray 200 are required to compensate for a deviation from a desired Z height.

Figure 7:
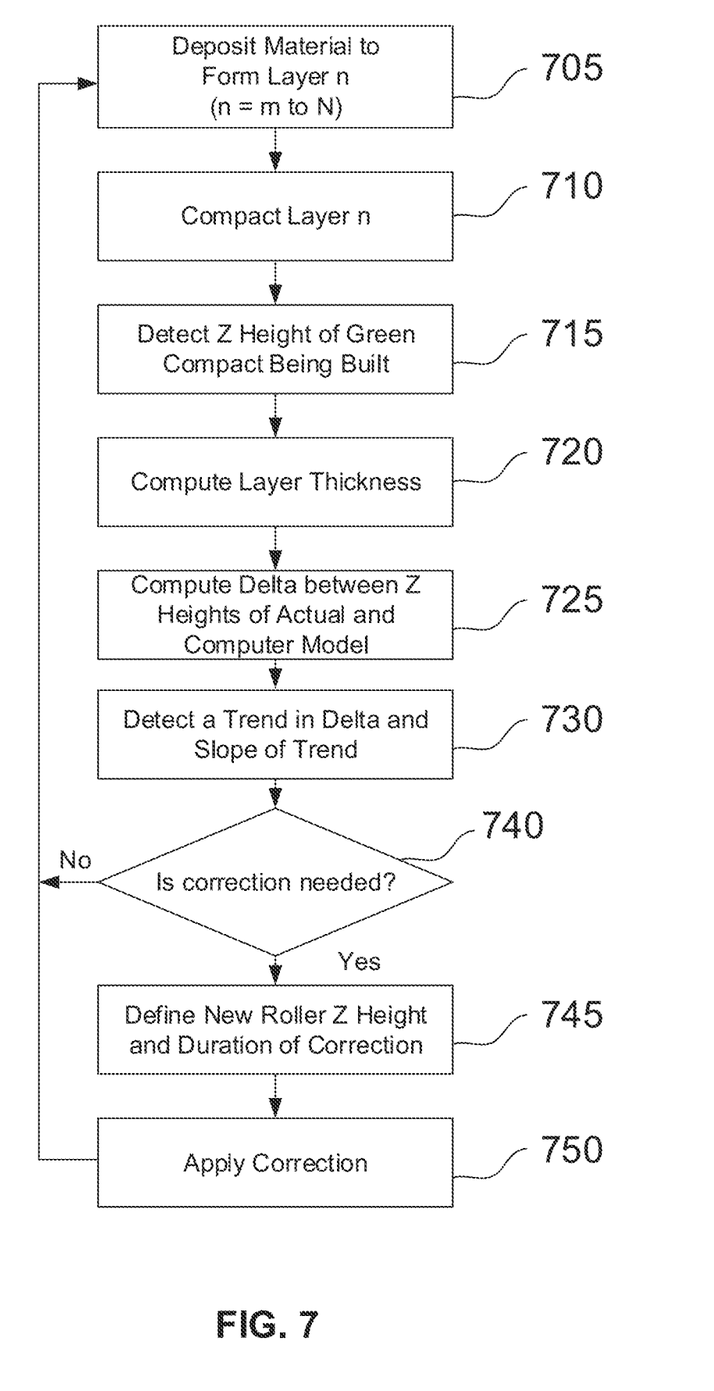
FIG. 7 is a simplified flow chart of an example method for dynamically controlling layer thickness in accordance with some embodiments of the present invention.

Reference is now made to FIG. 7 showing a simplified flow chart of an example method for dynamically controlling layer thickness in accordance with some embodiments of the present invention. For each layer being built, material is deposited (block 705) and the layer is compacted (block 710). In some example embodiments, after compaction of a layer, Z height of the green compact being built is detected (block 715). Z height of the green compact may be determined based on a measured height of a Z carriage that presses the layer against a pressing plate with pre-defined pressure. Thickness of a current layer may be calculated i.e. computed as a difference between Z height detected in a previous layer and Z height detected in the current layer (block 720). In some example embodiments, the detected Z height is compared to a Z height of a corresponding slice in a computer model of the green compact based on which the green compact is being printed. Optionally, the Z height of a corresponding slice in a computer model of the green compact is a defined thickness of each layer multiplied by the number of layers already built. For example, if each layer is defined by the computer model to have a thickness of 150 µm the expected Z height for the 100$^{th}$ layer may be 15 mm. In some example embodiments, the green compact is built over a base and the number of layers included in the base is also taken into account when determining the expected Z height.

According to some example embodiments, a delta between the measured Z height and the computer model Z height is determined (block 725) and dynamic control of subsequent layer thicknesses is defined based on this computed delta and its behavior over the course of building the green compact.

In some example embodiments, the delta measurements are monitored to detect a trend and a slope of a detected trend (block 730). Example trends may include an upward trend over a plurality of layer building cycles, a downward trend over a plurality of layer building cycles and a flat trend over a plurality of layer building cycles. Correction is initiated (block 740) when a trend is detected over a defined number of cycles and magnitude of the slope of the trend is above a defined threshold.

According to some example embodiments, deviations in Z height due to variable layer thicknesses may be controlled by computing defined changes to Z height of the roller with respect to the building tray that may be implemented over a plurality of cycles to correct for a drift in a current Z height of the green compact (block 745). The defined changes to Z height of the roller may be within a pre-defined range. The correction may be applied in the subsequent building cycles (block 750). Additional corrections may be applied after the defined number of cycles has been completed and a new trend is detected in subsequent cycles. In some example embodiments, changes in Z height of the roller and number of cycles are defined based on a machine learning process. For example, controller 300 may detect a response to an applied correction and adjust the next correction based on the detected response.

Figure 8:
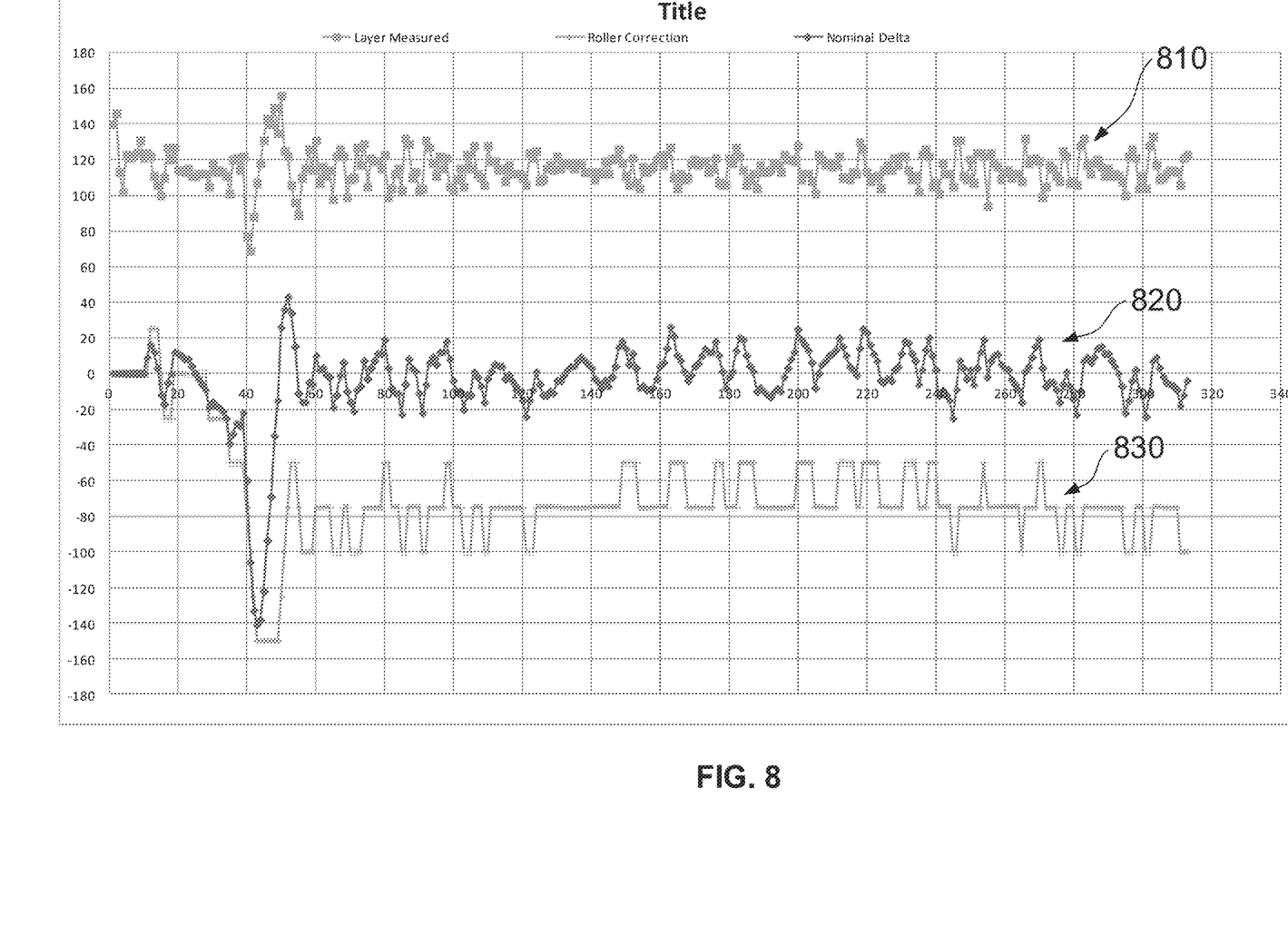
FIG. 8 is an example graph showing measured layer thickness of a plurality of layers, example drift in Z heights per layer and example corrections to roller height all in accordance with some embodiments of the present invention.

Reference is now made to FIG. 8 showing a graph of example measured layer thicknesses, example drifts in Z heights and example corrections to roller height all in accordance with some embodiments of the present invention. According to some example embodiments, layer thickness (curve 810) and deviation in Z height (curve 820) are monitored and based on these parameters, changes to a height of a roller with respect to a building surface is made (curve 830). In example embodiments, layer thickness of layer n is defined as a detected Z height at layer 'n' minus a detected Z height at layer 'n-1'. According to example embodiments, it is desired to maintain a uniform layer thickness throughout the building process. Although variations are expected and may occur even when all the layers will be built by the correct tolerance, it is desired to maintain the variation within a defined range and avoid significant deviations in Z height due to these variations. In some examples, relative large oscillations in layer thickness may be expected over a first plurality of layers before convergence toward a more steady value may be achieved based on the methods described herein. As can be seen in the example shown, relatively large variations of between 70-160 µm were recorded between layer 40 and layer 60 and then variations in layer thickness converged to more modest variations of between about 100 and 130 µm as the building progressed and compensation was provided. The relatively large dip to 70 µm around layer 40 may typically be due to a change in Z height due to further compaction of the previous layers as the new layers are being formed and compacted. Changes in Z height due to further compaction of previous layers is typically more pronounced over the first few layers, e.g. first 100 layers when Z height of the model is closer to a Z height of an individual layer.

Curve 820 represents a detected deviation in Z height and is computed as Z height measured at layer 'n' minus Z height defined by a corresponding slice 'n' in a computer model. In some example embodiments, deviation in Z height is compensated for or corrected based on altering a height of a roller over subsequent building cycles. Typically, a thickness of a layer may be manipulated by altering the height of the roller. When the roller is raised, the thickness of the layer is increased and when the roller is lowered, a thickness of the layer is reduced. In some example embodiments, roller height is adjusted based on a machine learning process. According to embodiments of the present invention, a goal of the machine learning process is to converge curve 820 toward zero and to converge curve 810 to a uniform value.

In some example embodiments, changes to the roller height are limited to a defined range. If the roller is raised above a maximum threshold height, a desired continuity between a printed layer pattern on adjacent layers may be lost due to added height of the powder material that covers the printed material. If the roller is lowered below a minimum threshold height, a height of any printed material may not be supported by powder material surrounding it and the pattern may collapse during layer compaction. Instead, adjustments are made based on defining changes in roller height as well defining a number of layers over which the change is maintained. Changes in roller height may be due to Z movement of the roller or Z movement of a building tray.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A method for dynamically controlling layer thickness during an additive manufacturing process, the method comprising:
    operating a 3D printing system to build a block including an object with layers of powder material in an additive manufacturing process of said 3D printing system, wherein a cycle in the process includes:
        at a pattern printing station of said 3D printing system, selectively printing a layer pattern;
        at a powder spreading station of said 3D printing system, spreading a powder layer over the layer pattern with a spreader; and
        at a compacting station of said 3D printing system, compacting the powder layer with the layer pattern;
    by an optical sensor, detecting a height of the block after each layer is compacted; and
    by a controller of said 3D printing system:
    determining a delta between the detected height and a height in a computer model defining layers of the block;
    determining a trend and a slope in the deltas over a plurality of cycles; and
    compensating for the determined trend and slope of the deltas in subsequent cycles by altering the height of the spreader with respect to the block, wherein said altering is executed based on defining both a change in the height of the spreader and a number of layers over which the change is maintained, such that a change in the height of the spreader is limited to a defined range.

2. The method of claim 1, wherein the height of the block is detected while the block is pressed against a pressing plate at a defined pressure.

3. The method of claim 1, wherein the optical sensor is selected from the group consisting of a line-of-sight sensor, laser based refraction sensor and laser based diffraction sensor.

4. The method of claim 1, wherein the height of the block is detected with a plurality of optical sensors spatially distributed with respect to the layer.

5. The method of claim 4 comprising determining height of the block based on average outputs from the plurality of optical sensors.

6. The method of claim 4, comprising determining flatness of an upper surface of the block based on comparing output from the plurality of optical sensors.

7. The method of claim 3, wherein the height of the block is detected while selectively printing the layer pattern.

8. The method of claim 3, wherein the one or more optical sensors are mounted on a printing heads block ahead of the printing heads with respect to direction of movement of the printing heads block.

9. The method of claim 1, wherein compacting the powder layer comprises raising a building surface on which the block is supported toward a pressing plate and pressing the powder layer against the pressing plate with a defined compaction pressure.

10. The method of claim 9, further comprising:
    lowering the building surface to an extent that the block disengages from the pressing plate;
    raising the building surface toward the pressing plate after the lowering;
    pressing the block against the pressing plate with a defined pressure; and
    detecting height of the building surface while the defined pressure is applied.

11. The method of claim 10, wherein lowering the building surface is configured to release residual stresses on the pressing plate and on the block during the compaction.

12. The method of claim 9, wherein the defined pressure for measuring a height of the block is between 0.1 to 1 MPa.

13. The method of claim 1, wherein a pressure applied for compaction is between 250 MPa and 300 MPa.

14. The method of claim 1, wherein the block is supported on a Z carriage and the height of the block is detected based on a detected height of the Z carriage while a Z-axis drive piston presses the powder layer against a pressing plate with the pre-defined pressure.

15. The method of claim 1, comprising monitoring a thickness of the layers, wherein the thickness of a single layer is defined as a difference between the detected height of the block over two consecutive cycles.

16. The method of claim 1, wherein the altering of the height of the spreader is within a range of between 60 μm to 300 μm.

17. The method of claim 1, wherein: the layer pattern is printed with thermal ink; the powder material is metal powder; the block is a green compact; or any combination thereof.

* * * * *